(12) United States Patent
Suarez et al.

(10) Patent No.: US 6,298,306 B1
(45) Date of Patent: Oct. 2, 2001

(54) VEHICLE LOCATING SYSTEM UTILIZING GLOBAL POSITIONING

(75) Inventors: Gustavo G. Suarez; Carlos S. Baradello, both of Boca Raton; Salvador Sibecas, Lake Worth, all of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/362,545

(22) Filed: Jul. 28, 1999

(51) Int. Cl.[7] .................................. H04B 7/14; G01S 5/02
(52) U.S. Cl. ...................... 701/213; 701/300; 342/357.07
(58) Field of Search .................................... 701/207, 213, 701/300; 342/357.06, 357.07, 357.09, 357.1, 44, 45; 340/991, 993, 989

(56) References Cited

U.S. PATENT DOCUMENTS

| | | | |
|---|---|---|---|
| 4,177,466 | * 12/1979 | Reagan | 342/456 |
| 4,818,998 | * 4/1989 | Apsell et al. | 342/444 |
| 5,003,317 | * 3/1991 | Gray et al. | 342/457 |
| 5,218,367 | 6/1993 | Sheffer et al. | |
| 5,418,537 | * 5/1995 | Bird | 342/357 |
| 5,631,642 | 5/1997 | Brockelsby et al. | |
| 5,767,804 | * 6/1999 | Murphy | 342/357 |
| 5,898,391 | 4/1999 | Jefferies et al. | |
| 6,140,956 | * 10/2000 | Hillman et al. | 342/357.07 |

* cited by examiner

Primary Examiner—Michael J. Zanelli
(74) Attorney, Agent, or Firm—Philip M. Macnak; Randi L. Dulaney

(57) ABSTRACT

A vehicle locating system (200) includes a beacon (108) carried by a vehicle, a tracking control station (106) for generating a beacon activation signal (110) which enables the beacon (108) to broadcast a vehicle identification signal (112), and one or more mobile communication devices (116, 118) which include a first receiver (516) utilized to receive a location signal (122) identifying a geographic location of a mobile communication device, and a transceiver (406) utilized to provide communication between said mobile communication device and a communication system controller. The one or more mobile communication devices (116, 118) further include a second receiver (502) utilized to receive the vehicle identification signal (112) broadcast by the beacon (108), and a vehicle tracking controller (520), responsive to the vehicle identification signal (112) which is received, for controlling a transmission of the vehicle identification signal (112) and the location signal (122).

16 Claims, 10 Drawing Sheets

VEHICLE LOCATING SYSTEM UTILIZING GLOBAL POSITIONING

BACKGROUND OF THE INVENTION

1. Field of the Invention

This invention relates in general to vehicle locating systems, and more specifically to a vehicle locating system which utilizes mobile tracking devices having global positioning.

2. Description of the Related Art

There are a number of vehicle location systems that are in use which provide stolen vehicle tracking and/or locating services. One such vehicle tracking system uses mobile tracking units located in police cars which allow the police to track and locate a stolen vehicle. In such a system, the owner of the stolen vehicle reports to the police network when a vehicle is stolen. The police network activates a miniature transmitter located within the stolen vehicle which allows the police to track the stolen vehicle. The police are then able to locate and recover the stolen vehicle when the stolen vehicle remains within the existing police network. The ability to track and locate the stolen vehicle in such a system is dependent largely on the number of police vehicles participating in the tracking and the size of the area which can be covered by the number of police vehicles available.

Another such vehicle location system uses stationary towers on top of buildings on which are installed directional antennas which are used to triangulate the location of the stolen vehicle. Such stationary tower sites are extremely expensive to set up and maintain. In addition, it is very hard to find transmitting/receiving sites in large metropolitan areas which are suitable for such stationary tower sites. And even after a location within the city is found upon which to erect a stationary tower, the location could turn out to be full of high level interfering signals so close to the operating band that it would be impossible to filter them out. This problem is especially true in many third world and emerging countries, as there are no government bodies in place which carry the enforcing powers that belongs to the FCC in the U.S. Consequently, there is no control over how many antennas or what operating frequencies are present at any of the stationary antenna sites.

Faced with all these problems, what is needed is a vehicle location system that would allow drastic cuts in the infrastructure cost by reducing the number of sites needed within the city without sacrificing system reliability.

DETAILED DESCRIPTION OF THE INVENTION

Figure 1:
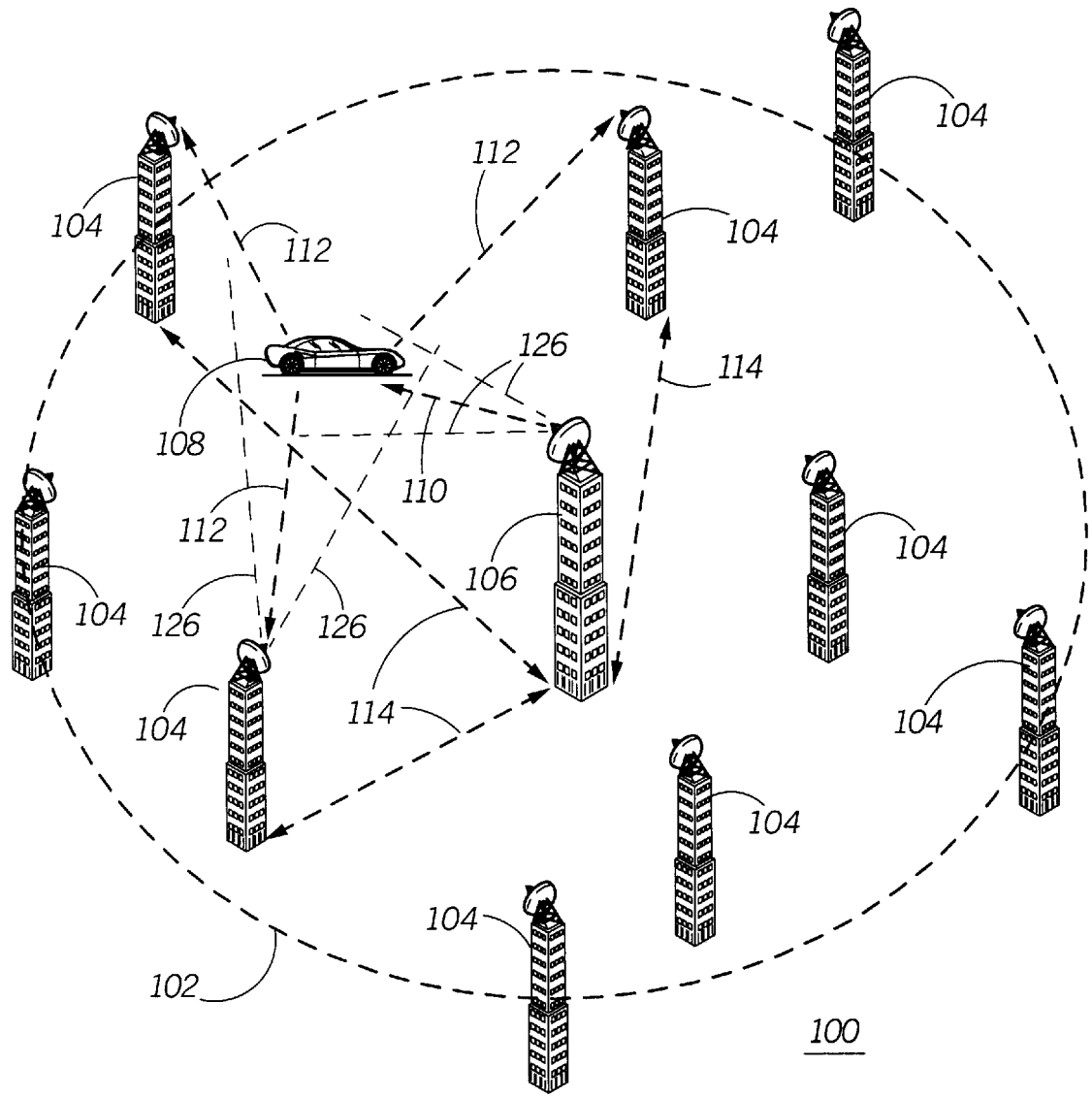
FIG. 1 is a diagram of a prior art vehicle location system.

FIG. 1 is a diagram of a prior art vehicle location system 100 which utilized a plurality of stationary location towers, herein after referred to as tracking stations 104, which provide tracking coverage for a predetermined geographic area 102. The predetermined geographic area 102 can represent a city; small, medium, or large metropolitan area, county, an so forth. A transceiver beacon, herein after referred to as beacon 108, is installed in vehicles to be protected, such as an automobile as shown. The beacon 108 provides a radio frequency (RF) output of typically 4 watts which is used to track and locate a stolen vehicle when activated. When a vehicle is stolen, the beacon 108 could be activated autonomously by a vehicle alarm, or by an beacon activation signal 110 that is sent from a central tracking station, hereinafter referred to as a tracking control station 106, once the owner of the vehicle reports the theft. As shown in FIG. 1, the tracking stations 104 were typically deployed along the perimeter of and within the predetermined geographic area 102 within which vehicle location service was provided. Each of the tracking stations 104 typically employed a circular array of half-wave dipole antennas that were used to determine the angle of arrival of the beacon signals 112 radiating from the stolen vehicle. It will be appreciated that the resolution of such a tracking system was dependent upon the number of quadrants into which the circular array of antennas was divided. To pinpoint the location of a stolen vehicle, the prior art vehicle location system 100 needed at least two of the tracking stations 104 to have received the beacon signals 112. Those tracking stations 104 that received the beacon signals 112 sent relative direction information from the beacon 108 to a tracking control station 106. The relative direction information corresponded to the antenna segment receiving the strongest beacon signal. It will also be appreciated that the relative direction information could also have included a relative distance measurement, which would be derived from the actual received signal strength or from a bit error rate measurement, as is well known in the art. The relative direction measurements were forwarded to the tracking control station 106 from the tracking stations 104, by way of a communication link 114, which may be either telephone lines, a radio frequency (RF) link, or other well known communication link. At the tracking control station 106, a processor, such as a personal computer (PC) equipped with the appropriate tracking software could, when properly implemented, project onto an electronic map of the tracking area, lines 126 depicting the area covered by the beam segments to identify a relative location of the stolen vehicle. Such a vehicle location system might have a resolution of approximately +/−1.5 Km. When the relative location of the stolen vehicle was determined, the relative location could be passed to a recovery vehicle which was equipped with a conventional mobile tracking receiver to assist in the final location and recovery of the stolen vehicle.

As it can be seen from FIG. 1, the vehicle location system of the prior art typically required a large number of tracking stations 104 distributed throughout the city and border of the area in which tracking was to be provided in order to achieved a high level of reliability. As described above, especially in very large cities or metropolitan areas, finding locations for the stationary location towers that are both suitable for use as tracking stations 104 and are affordable can be a problem. Furthermore, in cities that have large buildings, being able to accurately determine the actual location of the stolen vehicle can be hindered due to among other things, multi-path signal propagation issues. Even when the co-ordinates of the stolen vehicle were determined, as described above, there was significant uncertainty in the vehicle's actual location so as to require a recovery vehicle to be sent out to determine the actual vehicle location. If the stolen vehicle leaves the tracking area before it could be located, there was a possibility the stolen vehicle may not be recovered using the location tracking techniques described above.

Figure 2:
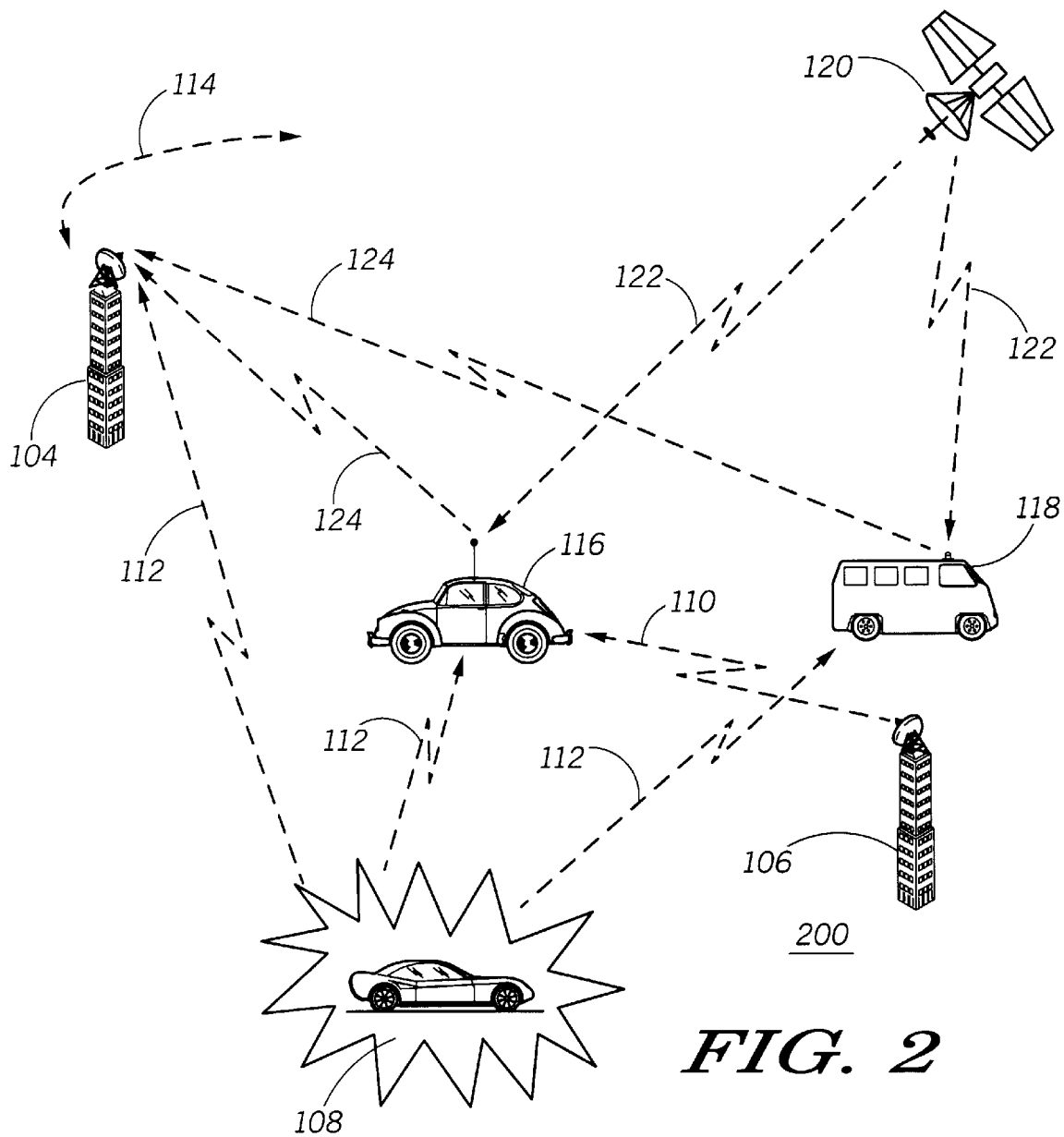
FIGS. 2 and 3 are diagrams of a vehicle location system in accordance with the present invention.
Figure 3:
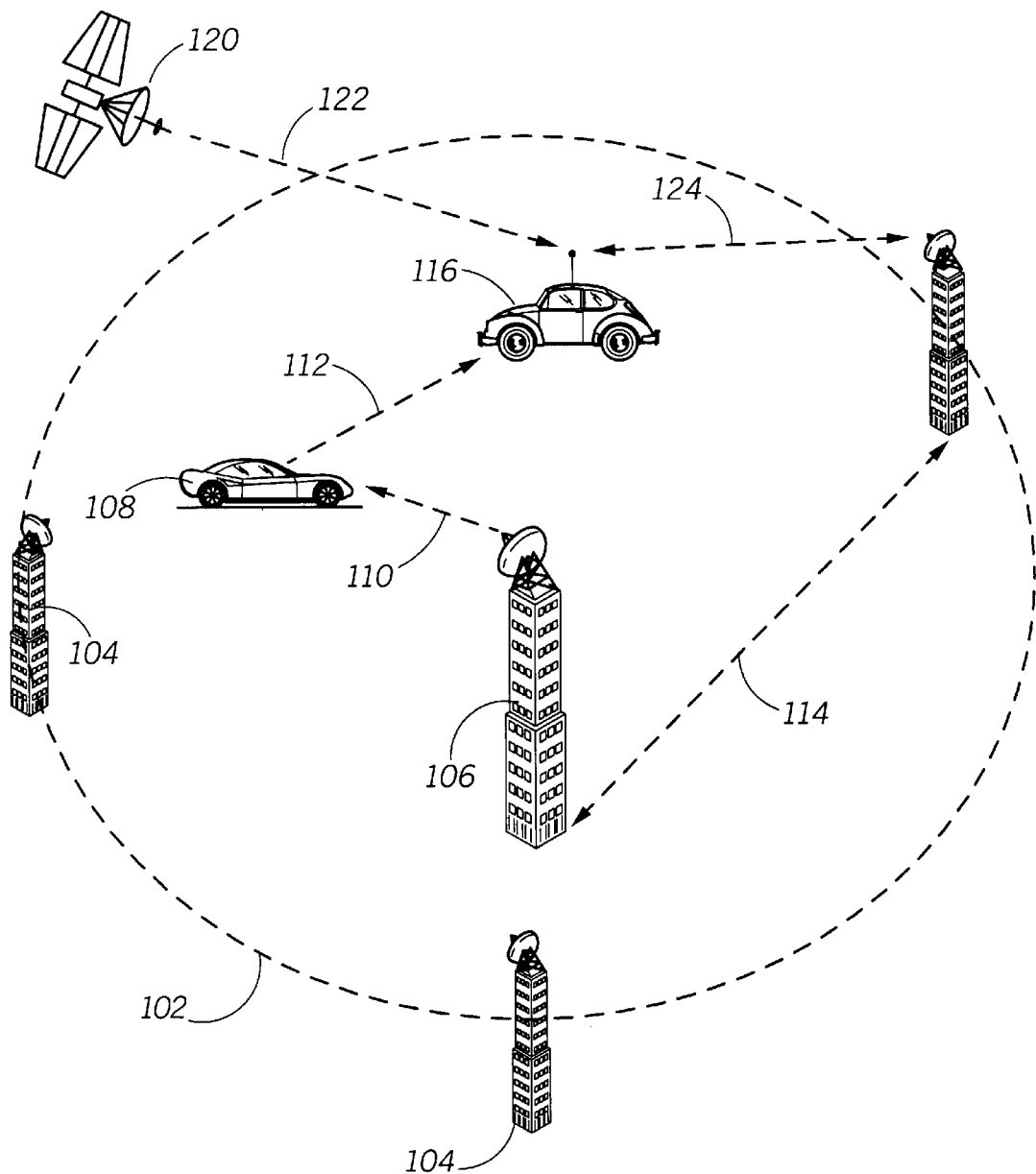

FIGS. 2 and 3 are diagrams of a vehicle locating system 200 in accordance with the present invention. Referring first to FIG. 2 is shown a stolen vehicle carrying a beacon 108 which broadcasts the beacon signals 112 when enabled, either automatically, such as when the vehicles alarm system is triggered, or by way of a beacon activation signal 110 which originates from the tracking control station 106, as shown in FIG. 3. It will be appreciated that the beacon activation signal 110 could also be transmitted from one or more of the tracking stations 104, as well, depending upon the size of the geographic area being covered. The location of the stolen vehicle is tracked by receiving the beacon signals 112 by either the tracking stations 104, or by one or more vehicles operating within the geographic tracking area which have been equipped with beacon detection receivers, hereinafter referred to as stealth receivers, as will be described below. In the preferred embodiment of the present invention, vehicles which communicate over a dispatched mobile radio channel, such as cabs or buses utilizing mobile communication transceivers 116 and 118, respectively can be utilized to carry a stealth receiver. The position of each of the dispatched vehicles is preferably provided through the use of a Global Positioning System (GPS) using global positioning system satellites 120, of which only one satellite is shown by way of example. The global positioning system satellites 120 generate global positioning (GPS) signals 122 in a manner well known in the art, that are received by a global positioning receiver to determine the actual location of the vehicle. The accuracy in locating the dispatched vehicles using the GPS system is considerably greater then that obtained by the triangulation method described above. It will be appreciated that positioning of the dispatched vehicles can also be updated periodically, such as each time the mobile communication transceiver communicates with the dispatcher. When beacon signals 112 are picked up by any of the mobile communication transceivers 116, 118, the vehicle identification information is recovered from the beacon signals 112 and re-broadcast by the mobile communication transceivers 116, 118 together with the location signals 124 which represents the current position of the mobile communication transceivers 116, 118. The received average amplitude of the beacon signal can also be recovered and sent as part of the location signals 124 which allows the system to resolve multiple mobile communication transceivers 116, 118 receiving the same signal.

When the beacon information and the location signals 124 are received at any of the tracking stations 104, the information is transmitted to the tracking control station 106 by way of phone lines, or any other suitable communication link 114 utilized for transferring information between the tracking control station 106 and the tracking stations 104.

Figure 4:
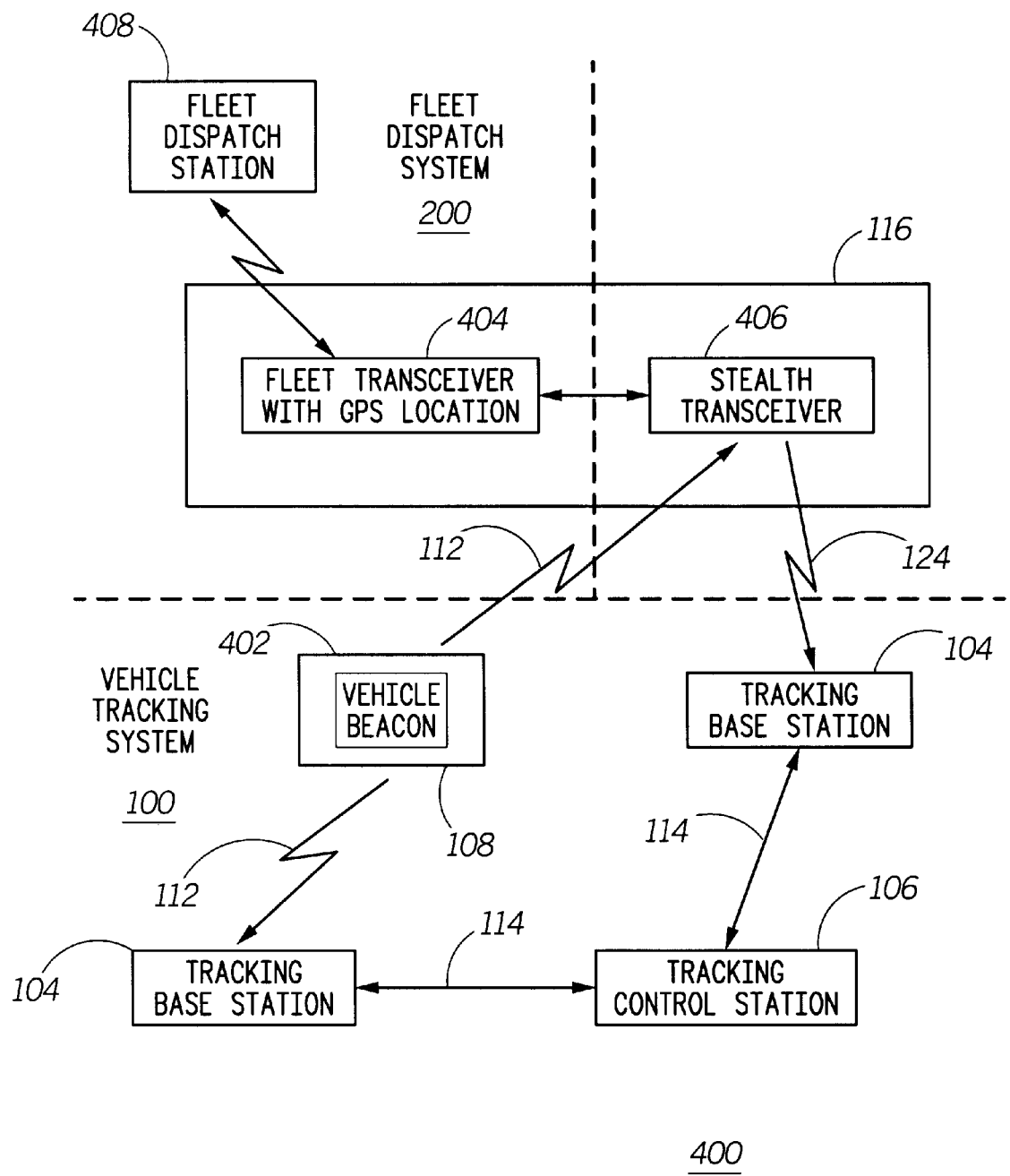
FIG. 4 is an electrical block diagram of the vehicle location system in accordance with the present invention.

FIG. 4 is a block diagram of a vehicle location and dispatch system 400 in accordance with the present invention. The vehicle location and dispatch system 400 utilizes in part vehicle tracking such as described for FIG. 1. However, the vehicle location and dispatch system 400, unlike the vehicle tracking system of FIG. 1, uses vehicles which are dispatched by way of a fleet dispatch system, such as would be utilized to dispatch cabs and buses. Also unlike the prior art system previously described, the vehicle location and dispatch system 400 of the present invention utilizes a stealth transceiver 406 which is coupled to, and communicates with a fleet transceiver 404 providing GPS location capability which allows the vehicles to be constantly tracked to improve vehicle dispatching. When a beacon signal is received by a stealth receiver 406, the current location of the dispatched vehicle is recovered from the fleet transceiver 404. It is important to note that recovery of the location information is preferably independent of the operation of the dispatched vehicle, thus the driver of the dispatched vehicle is unaware any transmission which identifies a stolen vehicle is taking place, thereby keeping the driver of the dispatched vehicle out of harms way. Thus in the preferred embodiment of the present invention, as the stolen vehicle travels about the vehicle tracking system coverage area, the stolen vehicle is ensured of coming into radio contact with many dispatched vehicles, depending upon how large the fleet of dispatched vehicles is, and the area of commerce covered by the dispatched vehicles. The position of the stolen vehicle can be continuously updated, as the position of the stolen vehicle is updated by reports from other dispatched vehicles with a stealth transceiver 406 as well. Potentially, this will lead to a more rapid interception of the stolen vehicle by the proper authorities, be they police or tracking service personnel who have the authority to intercept the stolen vehicle and apprehend the driver. Also, since the area in which the dispatched vehicles travel continuously changes, the opportunity to detect the stolen vehicle beyond the area normally covered by stationary tracking stations is improved.

Figure 5:
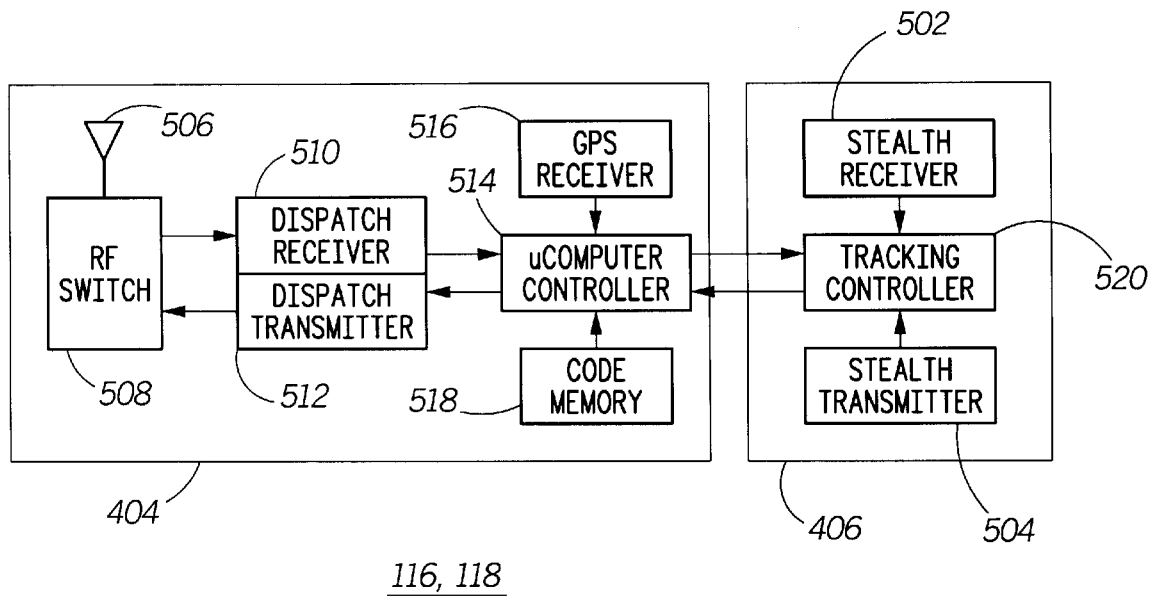
FIG. 5 is an electrical block diagram of a mobile communication transceiver in accordance with the present invention.

FIG. 5 is an electrical block diagram of the mobile communication transceivers 116, 118 in accordance with the present invention. A fleet transceiver 404 having GPS location capability includes an antenna 506 by which radio frequency signals are intercepted and transmitted. A radio frequency switch 508 selectively couples received signals to a dispatch receiver 510, and couples signals to be transmitted to the antenna 506 from a dispatch transmitter 512. The signals that are recovered by the dispatch receiver 510 may be either analog voice signals, or digitized voice and/or data signals. The recovered voice and or data signals are processed by a controller 514, preferably implemented using a microcomputer, such as an MC156805C16 manufactured by Motorola, Inc., to produce a voice signal which is reproduced by a speaker (not shown), or a data signal which is reproduced on a display (not shown). A GPS receiver 516 continuously receives GPS signals generated by the global positioning system satellites 120, to provide continual updates for the dispatched vehicles position. A code memory 518 stores such information as a vehicle identification number which is utilized to identify the dispatched vehicle when it communicates with the dispatch station. Overall operation of a fleet transceiver 404 having GPS location varies according to the type of dispatch system being implemented, and is generally well known in the art. Unlike a prior art fleet receiver having GPS location capability described above, the fleet transceiver 404 having GPS location in accordance with the present invention includes a stealth transceiver 406 which is electrically connected, but the operation of which is independent of the operation of the fleet transceiver 404 having GPS location. A tracking controller 520 is used to control the operation of a stealth receiver 502 and a stealth transmitter 504. Operation of the stealth transceiver 406 is controlled by the tracking controller 520 which controls the recovery of the beacon signals 112 broadcast by a stolen vehicle, and also controls the recovery of the current location of the dispatched vehicle from the GPS receiver 516. The tracking controller 520 then controls a transmission of a vehicle identification signal and a location signal from the stealth transmitter 504.

In an alternate embodiment of the present invention, the dispatch receiver 510 and the stealth transceiver 504 can be implemented using a single transceiver which includes a frequency synthesizer for generating transmit and receive frequencies and a time division duplex multiple access (TDMA) signaling format.

Figure 6:
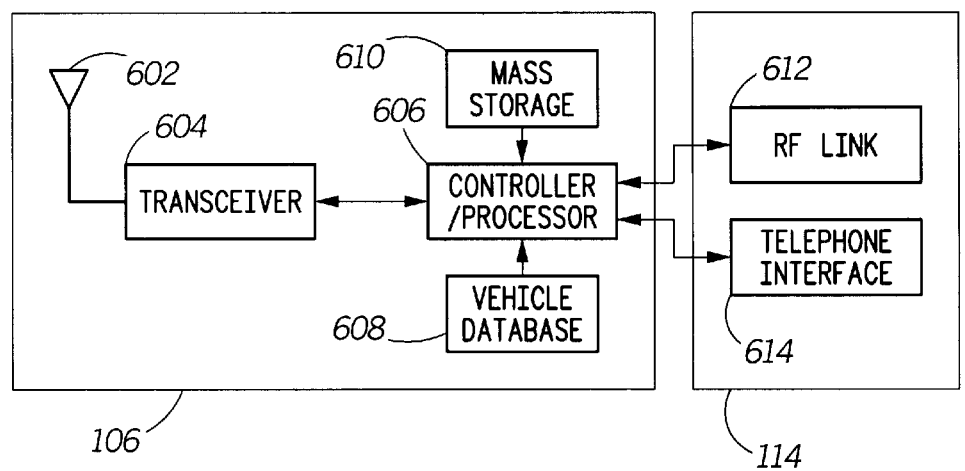
FIG. 6 is an electrical block diagram of a tracking station in accordance with the present invention

FIG. 6 is an electrical block diagram of a tracking station in accordance with the present invention. The tracking stations 104 includes an antenna 602 which is used to transmit the beacon activation signals 110 and to intercept the beacon signals 112 broadcast by the stolen vehicle. A transceiver 604 is utilized to receive and process the intercepted beacon signals 112 in a manner well known in the art, and to generate and transmit the beacon activation signals 110, also in a manner well known In he art. The reception of beacon signals 112, and the transmission of beacon activation signals is controlled by a controller/processor 606. A vehicle database 608 provides the controller/processor 606 information pertinent to the vehicles potentially being tracked, and a mass storage memory 610 is utilized to store location information pertaining to the vehicle being tracked. Since numerous dispatch vehicles can potentially provide information of the location of the stolen vehicle, the mass storage element 610 must be capable of storing relatively large amounts of data. The vehicle location information stored in the mass storage element 610 is sent to the central station either by way of a communication link which may be either a conventional telephone link through the public switch telephone network utilizing a telephone interface 614, or by way of an RF link 612.

Figure 7:
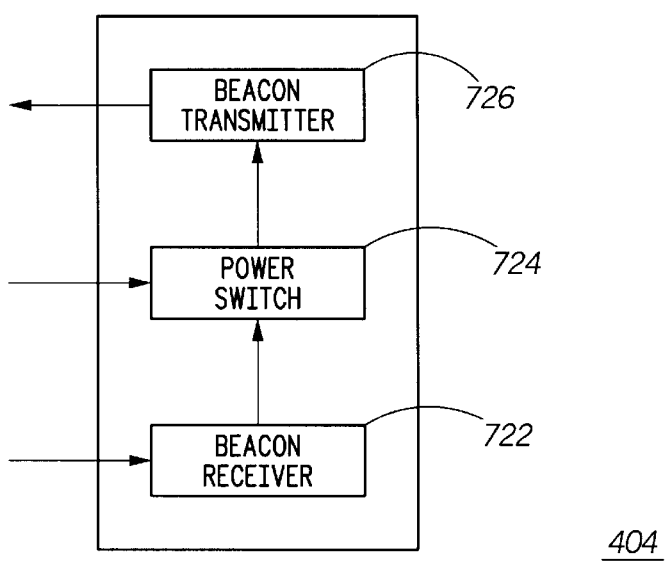
FIG. 7 is an electrical block diagram of a beacon in accordance with the present invention.

FIG. 7 is an electrical block diagram of a beacon 108 in accordance with the present invention. The beacon 108 includes a beacon receiver 722 which is used to receive the beacon activation signal 110 and a beacon transmitter 726 which is used to transmit the beacon signals 112. A power switch 724 is used to selectively supply power to the beacon transmitter 726 and the beacon receiver 722, such that either one or the other or both the beacon receiver 722 and the beacon transmitter 726 are powered up to initiate the transmission of the beacon activation signal 110, and the reception of the beacon signals 112, respectively.

Figure 8:
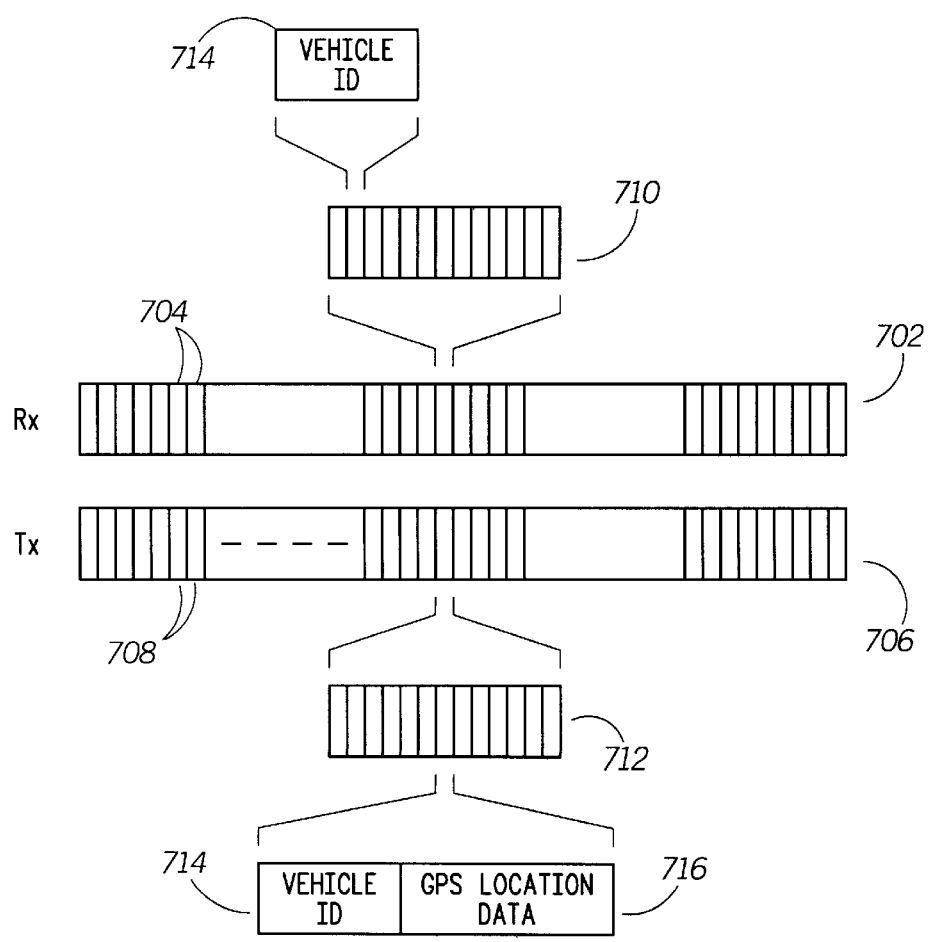
FIG. 8 is an timing diagram of a signaling protocol suitable for use in the preferred embodiment of the present invention.

FIG. 8 is a timing diagram of a typical signaling protocol suitable for use in the preferred embodiment of the present invention. The signaling protocol, as shown includes an outbound channel 702 for transmitting the beacon activation signal 110, for receiving the beacon signals 112, and an inbound channel 706 used for receiving the beacon signals 112. The outbound channel 702 is divided into a sequence of time division multiplexed reception frames 704. Each of the reception frames 704 may include a sequence of sub frames 710 which include among other things vehicle identification (ID) 714 information and any other information which provides the beacon activation signal 110. Each transmission frame 706 may also include a sequence of sub frames 712 which include among other things the vehicle ID 714 information and the GPS location data 716 which provides the beacon signals 112. The frequencies of operation utilized for vehicle tracking and location can be separate frequencies from those utilized by the dispatch vehicles for dispatching purposes, or where the amount of information utilized for dispatching is limited, the frequencies of operation utilized for vehicle tracking and location can be the same frequencies from those utilized by the dispatch vehicles for dispatching purposes.

Figure 9:
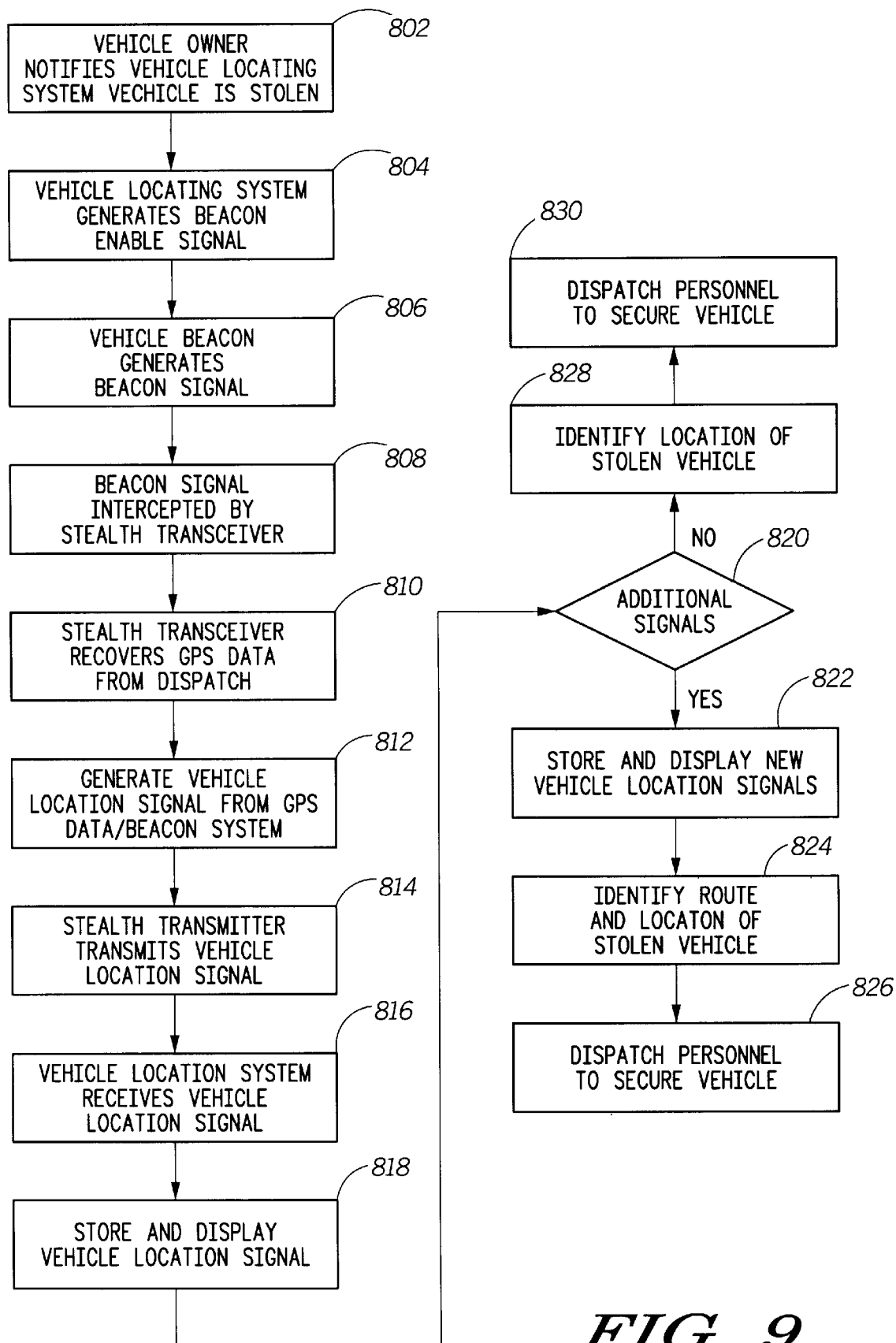
FIGS. 9 and 10 are flow charts of the operation of the vehicle location system in accordance with the present invention.
Figure 10:
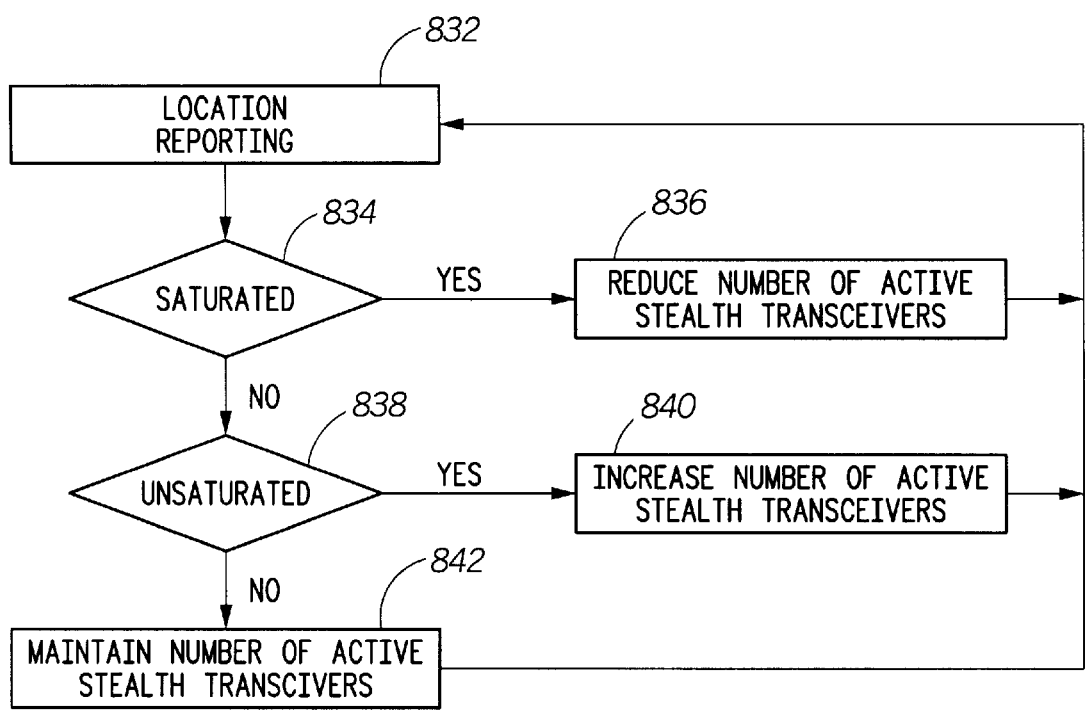

FIGS. 9 and 10 are flow charts depicting the operation of the vehicle location system in accordance with the present invention. When a vehicle owner becomes aware his/her vehicle has been stolen, the vehicle owner notifies the vehicle locating system that the vehicle is stolen, at step 802, rather than the police, as in prior art systems. The vehicle locating system generates the beacon activation signal, at step 804, broadcasting the signal throughout the coverage area of the vehicle locating system 200. Upon receiving the beacon activation signal 110, the vehicle beacon generates and begins transmitting the beacon signals 112, at step 806. The beacon signals 112 are intercepted by a stealth transceiver, or a tower, at step 808, when a dispatch vehicle passes within proximity of the stolen vehicle or the tower. A stealth transceiver recovers the GPS data generated for use by the vehicle dispatch system, a step 810, the GPS data identifying the present location of the dispatch vehicle when the beacon signal was received. The stealth transceiver generates a vehicle location signal using the GPS data and the vehicle ID, at step 812 which is then transmitted preferably along with the averaged received beacon amplitude by the stealth transmitter, at step 814. The vehicle locating system 200 receives the vehicle location signal, at step 816. The vehicle location information is stored and then subsequently displayed, at step 818. When there are no additional vehicle location signals received, generally within a predetermined period of time, the location of the stolen vehicle is identified, at step 828, and personnel are dispatched to secure the vehicle, at step 830. The vehicle tracking and locating system in accordance with the present invention improves the prospect of locating the stolen vehicle by receiving additional vehicle locations signals, from the same dispatch vehicle, or other dispatch vehicles, at step 820. The additional vehicle location information is stored, processed and displayed at step 822, providing therefrom a sequence of geographic locations at which the stolen vehicle was detected. In this manner, the route and location of the stolen vehicle can be determined at step 824, and again personnel can be dispatched to secure the vehicle at step 826.

Moving to FIG. 10, the number of dispatch vehicles reporting the location of the stolen vehicle is monitored at step 832. The tracking control station 106 determines whether the area in which the stolen vehicle is located is saturated, at step 834, or unsaturated, at step 838. When the tracking control station 106 determines the area is saturated, i.e. the number of dispatch vehicles reporting the location of the stolen vehicle is excessive, at step 834, a signal is sent out to reduce the number of dispatch vehicles reporting the location of the stolen vehicle. This is accomplished by assigning all dispatch vehicles into arbitrary groups, and activating only as many arbitrary groups of dispatch vehicles as required to obtain adequate geographic location information on the stolen vehicle. After the number of dispatch vehicles has been reduced, the tracking control station 106 determines whether the number of dispatch vehicles is excessive, at step 834, or unsaturated, at step 838. When the number of dispatch vehicles is neither saturated, at step 834, nor unsaturated, at step 838, the number of dispatch vehicles remains the unchanged tracking the stolen vehicle, at step 842. When the central station determines the area in which the stolen vehicle is located is unsaturated, at step 838, meaning there are not enough vehicles reporting to adequately track the location of the stolen vehicle, the number of arbitrary groups of dispatch vehicles increased, at step 840. After the number of dispatch vehicles has been increased, the tracking control station 106 determines whether the number of dispatch vehicles is excessive, at step 834, or unsaturated, at step 838. In this manner, unlike the prior art vehicle locating systems, the number of dispatch vehicles having stealth transceivers which are active can be changed, i.e. the number of vehicles utilized in tracking can be increased to increase the probability of detecting a stolen vehicle, or decreased to improve on determining the location of the stolen vehicle by eliminating excessive numbers of reports of the stolen vehicles present location.

Figure 11:
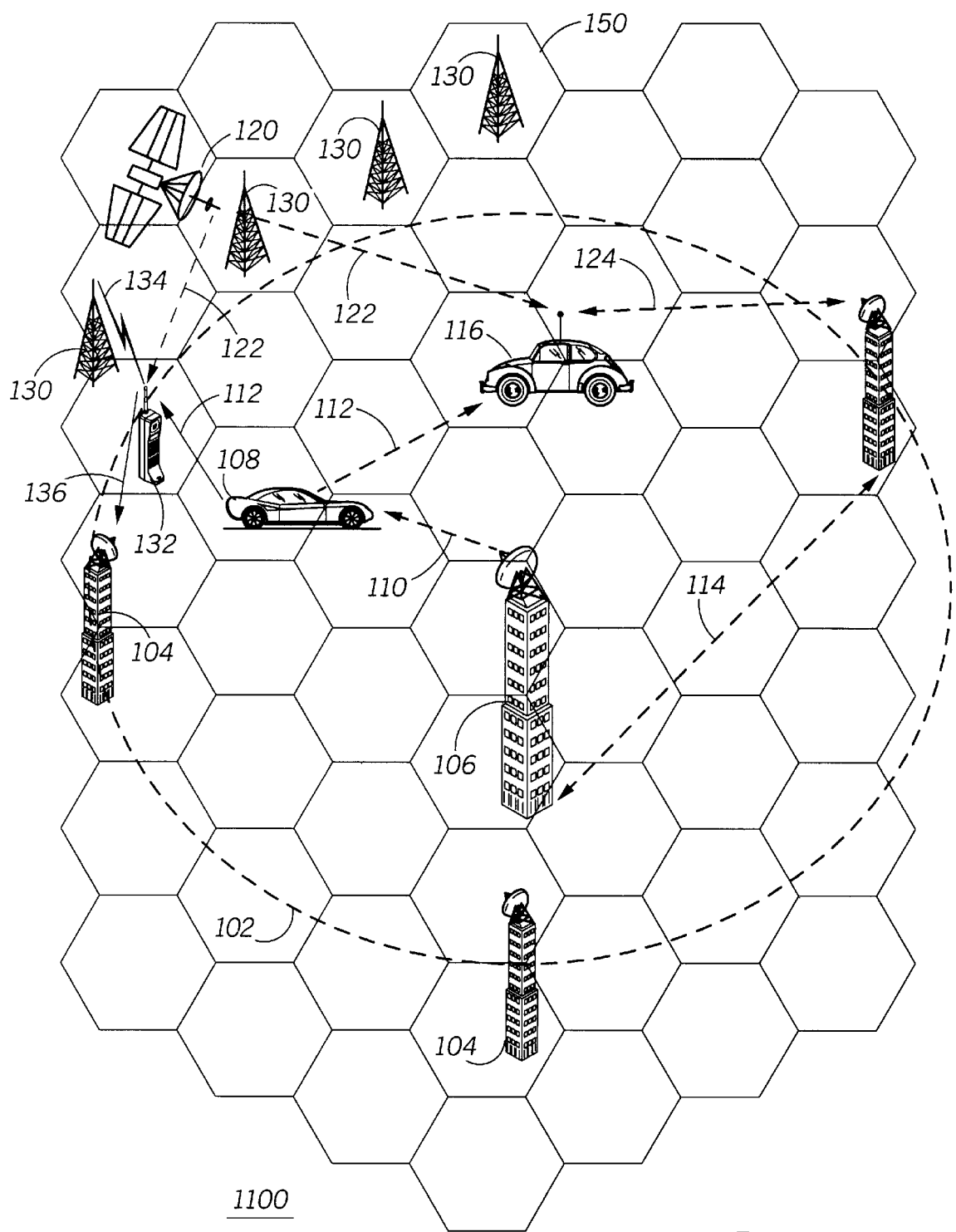
FIG. 11 is a diagram of a vehicle location system in accordance with an alternate embodiment of the present invention.

FIG. 11 is a diagram of a vehicle location system in accordance with an alternate embodiment of the present invention. As shown in FIG. 11, a two-way radio communication system 1100 can be overlaid over the vehicle location system, such as described in FIG. 3. The two-way radio communication system 1100 can be implemented by way of example as a cellular communication system, a mobile radio-telephone communication system, a special mobile radio system (SMR), or other two-way radio system. In the alternate embodiment of the present invention, a typical cellular system includes transceiver stations 130 located within coverage zones, or cells, 150, of which only one cell is identified by way of example. A portable or mobile cellular transceiver 132 communicate with the transceiver stations 130 over a group of call frequencies, or channels, 134. When the portable, or mobile cellular transceiver 132 is equipped with a GPS receiver for receiving location signals 124, such as GPS signals generated by the GPS satellite, and a stealth transceiver, as described previously above, the portable or mobile cellular transceiver can also be utilized to locate and track stolen vehicles. When the stealth transceivers are activated, the portable or mobile cellular transceiver 132 would receive receiver beacon signals 112 as described above. Detection of the beacon signals by any portable or mobile cellular transceiver 132 would result in a location signal 136 being generated by the portable or mobile cellular transceiver 132 being generated. The portable or mobile cellular transceivers are preferably assigned to particular groups of individuals, such as postal workers, security personnel and other groups of people, thereby increasing the likelihood of locating and tracking a stolen vehicle in the manner described above.

Figure 12:
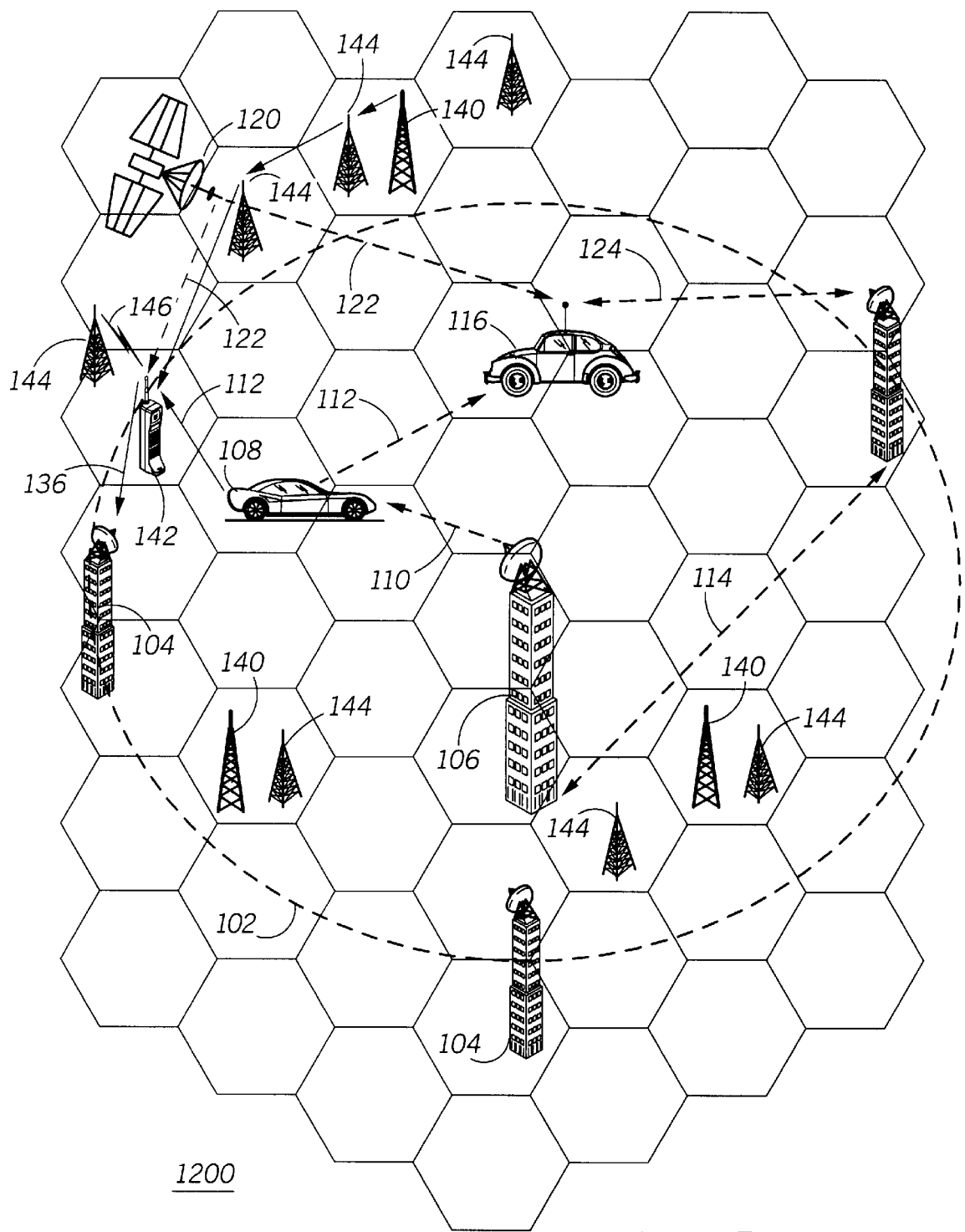
FIG. 12 is a diagram of a vehicle location system in accordance with a further alternate embodiment of the present invention.

FIG. 12 is a diagram of a vehicle location system in accordance with a further alternate embodiment of the present invention. FIG. 12 illustrates how a one way or two-way paging system 1200 can be overlaid with the vehicle locating system described above. Such a paging system includes transmitters 140 which generally operate in a simulcast transmission fashion to transmit paging messages to paging receivers 142. When the paging receivers 142 are two-way paging receivers, the receipt of a message, a response to the message, or a new message can be generated by the two-way paging receivers and transmitted as acknowledge back signal 146 to receivers 144 located throughout the geographic area covered by the paging system. In general, because the power output of a two-way paging receiver is typically less than one watt, many more receivers 144 would be located throughout he paging system then would be transmitters 140. Operation of such a one or two-way paging system is well known in the art. Again, as described above, when one-way and two-way pagers are coupled with a GPS receiver, and a stealth transceiver, as described above, additional locating and tracking capability can be provided. The location signal 136 can be broadcast from the stealth transceiver, as described above, or in the alternate, the acknowledge back signal 146 can be used to route the location signal through the two-way paging system.

In summary, a method and apparatus for providing a vehicle locating system 200 was described above which includes a beacon 108 carried by a vehicle; a tracking control station 106 for generating a beacon activation signal 110 which enables the beacon 108 to broadcast beacon signals 112 providing a vehicle identification signal; and one or more mobile communication devices. The mobile communications devices are one-way or two-way communication devices which further include a first receiver utilized to receive a location signal identifying a geographic location of a mobile communication device, and a transceiver utilized to provide communication between the mobile communication device and a communication system controller. The one or more mobile communication devices further include a second receiver utilized to receive the vehicle identification signal broadcast by the beacon, and a vehicle tracking controller, responsive to the vehicle identification signal which is received, for controlling a transmission of the vehicle identification signal and the location signal. The communication provided between the mobile communication device and the communication system controller is one of a voice communication and a data communication which includes the location signal in devices which support voice and or data communications, otherwise the communication provided is a data communication. The location signal identifies a current location of the mobile communication device. The mobile communication device further includes a transmitter for transmitting the vehicle identification signal and the location signal. The communication between the mobile communication device and the communication system controller is independent of the transmission of the vehicle identification signal with the location signal. The transceiver transmits the vehicle identification signal with the location signal. The communication between the mobile communication device and the communication system controller is synchronized with the transmission of the vehicle identification signal with the location signal. The vehicle locating system also includes a plurality of tracking stations 104 arranged about a perimeter of a geographic area for receiving the vehicle identification signal, the plurality of tracking stations 104 deriving therefrom relative distance measurements and relative direction measurements of the beacon 108 to each of the plurality of tracking stations receiving the beacon signals 112 providing the vehicle identification signal. The vehicle locating station includes a tracking control station 106 including a processor which is responsive to the relative distance measurements and the relative direction measurements of the beacon to each of the plurality of tracking stations for computing a location of the beacon. The location identifier used to track the stolen vehicle is preferably obtained using a global positioning system and a mobile communication device which includes a global positioning system (GPS) receiver. It will be appreciated that other methods of vehicle location, such as fixed sign post location systems which are well known in the art, can be utilized as well.

We claim:

1. A vehicle locating system, comprising:
a beacon carried by a vehicle being tracked;
at least two mobile communication devices which comprise
a first receiver utilized to receive a location signal identifying a current geographic location of a mobile communication device, and
a transceiver utilized to provide communication between said mobile communication device and a communication system controller,
said at least two mobile communication devices further comprising
a second receiver utilized to receive the vehicle identification signal broadcast by said beacon,
a vehicle tracking controller responsive to the vehicle identification signal which is received, for controlling a transmission of the vehicle identification signal and the location signal designating the current geographic location of said mobile communication device, and
a tracking control station for generating a beacon activation signal which enables said beacon to broadcast a vehicle identification signal, and further enables said transceiver to receive the vehicle identification signal.

2. The vehicle locating system according to claim 1, wherein the communication provided between the mobile communication device and the communication system controller is one of a voice communication and a data communication which includes the location signal.

3. The vehicle locating system according to claim 2, wherein the location signal identifies a current location of the mobile communication device.

4. The vehicle locating system according to claim 1, wherein said mobile communication device further comprises a transmitter for transmitting the vehicle identification signal and the location signal.

5. The vehicle locating system according to claim 4, wherein the communication between said mobile communication device and said communication system controller is independent of the transmission of the vehicle identification signal with the location signal.

6. The vehicle locating system according to claim 1, wherein said transceiver transmits the vehicle identification signal with the location signal.

7. The vehicle locating system according to claim 6, wherein the communication between said mobile communication device and said communication system controller is synchronized with the transmission of the vehicle identification signal with the location signal.

8. The vehicle locating system according to claim 1, further comprising a plurality of tracking stations arranged about a perimeter of a geographic area for receiving the vehicle identification signal, said plurality of tracking stations deriving therefrom relative distance measurements and relative direction measurements of said beacon to each of said plurality of tracking stations receiving the vehicle identification signal.

9. The vehicle locating station according to claim 8, wherein said tracking control station includes a processor which is responsive to the relative distance measurements and the relative direction measurements of said beacon to each of said plurality of tracking stations for computing a location of said beacon.

10. The vehicle locating system according to claim 1, wherein said mobile communication device is a vehicle mounted mobile transceiver which includes a location identifying device and a vehicle tracking transceiver.

11. The vehicle locating system according to claim 1, wherein said mobile communication device is a portable transceiver which includes a GPS receiver and a vehicle tracking transceiver.

12. The vehicle locating system according to claim 1, wherein said mobile communication device is a one way paging transceiver which includes a GPS receiver and a vehicle tracking transceiver.

13. The vehicle locating system according to claim 1, wherein said mobile communication device is a two-way paging transceiver which includes a GPS receiver and a vehicle tracking transceiver.

14. A vehicle locating system, comprising:
a beacon carried by a vehicle, said beacon generating a vehicle identification signal when said beacon is activated when said vehicle is being tracked,
at least two mobile communication devices carried by a tracking vehicle comprising:
a first receiver utilized to receive a location signal identifying a current geographic location of a mobile communication device; and
a transceiver utilized to provide communication between said mobile communication device and a communication system controller;
said at least two mobile communication devices further comprising
a second receiver utilized to receive the vehicle identification signal broadcast by said beacon,
a vehicle tracking controller, responsive to the vehicle identification signal which is received, for controlling a transmission of the vehicle identification signal and the location signal, and
a tracking control station which receives vehicle identification signal and current location signal from at least two mobile communication devices to estimate a location of said vehicle being tracked based on said tracking vehicle's current geographic location.

15. A mobile communication device, comprising:
a GPS receiver for receiving location signals identifying a current geographic location; and
first and second transceivers,
said first transceiver providing communication for the operator of the mobile communication device with a communicating party, said first transceiver being coupled to the GPS receiver, for transmitting the location signal identifying the current geographic location of mobile device, and
said second transceiver being used for tracking a vehicle, said second transceiver being activated when a beacon located within said vehicle being tracked has been activated.

16. The mobile communication device according to claim 15, wherein operation of first transceiver and said transceiver are independent of each other.

* * * * *